United States Patent
Vajjala et al.

(10) Patent No.: US 11,112,939 B2
(45) Date of Patent: Sep. 7, 2021

(54) DYNAMIC UPDATES FOR CONFIGURABLE MENU ITEMS

(71) Applicant: ServiceNow Inc., Santa Clara, CA (US)

(72) Inventors: Venu Gopal Rao Vajjala, Hyderabad (IN); Nitin Chugh, Hyderabad (IN); Prabodh Saha, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 257 days.

(21) Appl. No.: 15/973,011

(22) Filed: May 7, 2018

(65) Prior Publication Data
US 2019/0339821 A1 Nov. 7, 2019

(51) Int. Cl.
*G06F 11/36* (2006.01)
*G06F 9/451* (2018.01)
*G06F 3/0482* (2013.01)
*G06N 20/00* (2019.01)
*G06F 16/38* (2019.01)
*G06F 3/0484* (2013.01)

(52) U.S. Cl.
CPC ............ *G06F 3/0482* (2013.01); *G06F 16/38* (2019.01); *G06N 20/00* (2019.01); *G06F 3/04842* (2013.01)

(58) Field of Classification Search
CPC .. G06F 3/0482; G06F 16/38; G06F 17/30722; G06F 9/451; G06F 3/04842; G06N 20/00; G06N 99/005
See application file for complete search history.

(56) References Cited

U.S. PATENT DOCUMENTS

| | | | |
|---|---|---|---|
| 5,664,133 A | 9/1997 | Malamud | |
| 6,678,887 B1 | 1/2004 | Hallman | |
| 7,055,136 B2 | 5/2006 | Dzoba et al. | |
| 7,730,466 B2 * | 6/2010 | Wilson | G06F 8/33 717/110 |
| 8,983,982 B2 | 3/2015 | Rangarajan | |
| 9,047,411 B1 * | 6/2015 | Bienkowski | G06F 11/3664 |
| 9,508,051 B2 | 11/2016 | Falk | |

(Continued)

OTHER PUBLICATIONS

ServiceNow Documentation; Dynamic actions script for List v2 context menus, Jun. 15, 2017, https://docs.servicenow.com/bundle/jakarta . . . /page/ . . . /r_DynamicActionsScript.html (3 pages).

*Primary Examiner* — Jennifer N To
*Assistant Examiner* — Amy P Hoang
(74) *Attorney, Agent, or Firm* — Fletcher Yoder, P.C.

(57) ABSTRACT

Disclosed herein are systems and methods for dynamically generating menu items in response to a user selection of text in a scripting interface based on a context associated with the text and metadata associated with the text. Using the techniques disclosed herein, a computing system generates one or more menu items in a pop-up menu in response to a selection (e.g., right-click) of text. The computer system enables user customization of the menu items 132 aggregated on the pop-up menu 130, such that the user customization includes defining the task executed by a menu item in response to being selected from the pop-up menu and defining conditions in which the menu item may be generated in the pop-up menu. In some embodiments, machine-learning techniques may be implemented by the computing system to dynamically identify selection trends and predict suitable menu items to propagate on the pop-up menu.

19 Claims, 12 Drawing Sheets

(56) References Cited

U.S. PATENT DOCUMENTS

| | | |
|---|---|---|
| 9,535,674 B2 | 1/2017 | Cooper |
| 9,557,969 B2 | 1/2017 | Sharm |
| 9,582,187 B2 | 2/2017 | Gil et al. |
| 2002/0004933 A1* | 1/2002 | Dzoba ................. G06F 11/3664 717/128 |
| 2004/0003335 A1* | 1/2004 | Gertz ................... H03M 13/47 714/758 |
| 2010/0050154 A1* | 2/2010 | Balasubramanian ..... G06F 8/33 717/113 |
| 2012/0291006 A1* | 11/2012 | Quine ..................... G06F 8/00 717/105 |
| 2013/0019182 A1* | 1/2013 | Gil ....................... G06F 3/0482 715/738 |
| 2014/0047413 A1* | 2/2014 | Sheive .................... G06F 8/30 717/110 |
| 2018/0300227 A1* | 10/2018 | Bergen ................ G06F 11/362 |

\* cited by examiner

FIG. 4

| ≡ NAME | ≡ APPLICATION | ≡ ACTIVE | ≡ DESCRIPTION | ≡ UPDATED ▼ | ≡ SCRIPT |
|---|---|---|---|---|---|
| CCMAPI | GLOBAL | TRUE | API SCRIPT INCLUDE FOR ALL CCM RELATED F... | 2018-03-22 09:05:43 | var CCMAPI = Class.create(); CCMAPI.pro... |
| AssessmentUtils | GLOBAL | TRUE | ASSESSMENT ENGINE CORE UTILITES | 2018-01-21 22:03:51 | var AssessmentUtils = Class.create(); A... |
| WorkflowApprovalUtils | GLOBAL | TRUE | WORKFLOW APPROVAL SUPPORT UTILITIES... | 2018-01-19 12:04:21 | /*** *Workflow approval support utiliti... |
| IncidentUtilsSNC | GLOBAL | TRUE | THIS FUNCTION CONTAINS UTILITY FUNCTIONS... | 2018-01-15 10:00:22 | var IncidentUtilsSNC = Class.create(); l... |
| SLARepair | GLOBAL | TRUE | PROVIDES FUNCTIONS TO REPAIR TASK SLAs B... | 2018-01-11 08:17:54 | /** *Repair SLAs *Repair-Eras... |
| VCenterESXHostsSensor | GLOBAL | TRUE | IMPLEMENTATION OF THE "VMWARE-vCENTER... | 2017-12-12 16:23:09 | /*jshint -W030, -W083 */ var VCenterES... |
| JsonCi | GLOBAL | TRUE | | 2017-12-12 10:44:12 | /* jsint -W030, -W083 */ var JsonCi; ... |
| WFActivityHandler | GLOBAL | TRUE | ACTIVITY HANDLER FOR WORKFLOW ACTIVITY D... | 2017-12-10 12:46:34 | gs.include ('PrototypeServer'); varWFAc... |
| DiscoveryResult | GLOBAL | TRUE | WRAPPER API FOR CREATING / UPDATING DISOVE... | 2017-12-07 15:37:36 | var DiscoveryResult = Class.creat(); Di... |
| VCenterClustersSensor | GLOBAL | TRUE | IMPLEMENTATION OF THE "VMWARE-vCENTER... | 2017-12-07 11:21:20 | /*jshint -W030 */ var VCenterClustersS... |
| ReferenceFilterTableSelection | GLOBAL | TRUE | GET VALUE FOR SELECTED TABLE IN REFERENCE... | 2017-12-04 22:19:06 | var ReferenceFilterTableSelection = C... |

FIG. 7

| ≡ MENU-ITEM MAPS [NEW] GO TO [ACTIVE ▼] [SEARCH] | | | |
|---|---|---|---|
| ▽ ALL ⚙ | | | ◁◁◁ ▢ TO 6 OF 6 ▷▷▷ |
| ≡ ITEM —132 | ≡ MENU —130 | ≡ ORDER —182 | ≡ ACTIVE ▲ —166 |
| [SEARCH] | [SEARCH] | [SEARCH] | [SEARCH] |
| ☐ ⊙ OPEN TABLE —186 | SCRIPT INCLUDE MENU —184 | 1 | FALSE |
| ☐ ⊙ OPEN SCRIPT —188 | SCRIPT INCLUDE MENU | 2 | TRUE |
| ☐ ⊙ OPEN CHANGE —190 | ⌐ ¬ —192 | 1 | TRUE |
| ☐ ⊙ OPEN CHANGE | GLOBAL MENU | 1 | TRUE |
| ☐ ⊙ SEARCH IN WIKI | IA MENU | 1 | TRUE |
| ☐ [ACTIONS ON SELECTED ROWS... ▼] | | | ◁◁◁ ▢ TO 6 OF 6 ▷▷▷ |

DYNAMIC UPDATES FOR CONFIGURABLE MENU ITEMS

BACKGROUND

The present disclosure relates generally to dynamic updates for configurable menu items in a client instance.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Developing or writing computer code may require time to debug (e.g., identify and remove software and/or hardware errors) the computer code to enhance the efficiency and functionality of the operations performed by the computer code. In some instances, debugging the computer code may be achieved by reading through the entire computer code to identify errors. However, this method of debugging may be time consuming and lead to much human error. In certain existing applications, certain aspects of the script may be flagged as containing errors, for example, by underlining the flagged aspects of the code. However, even flagging portions of the code to identify them as faulty may be inadequate for efficiently developing, debugging, and modifying script because the developer is generally left to his own accord to remedy this error. It is now recognized that there is a need to improve the process of creating, modifying, and debugging computer code.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates to dynamically generating menu items in response to a user selection of text in a scripting interface based on a context associated with the text and metadata associated with the text. Using the techniques disclosed herein, a computing system generates one or more menu items in a pop-up menu in response to a selection (e.g., right-click) of text. The computer system enables user customization of the menu items aggregated on the pop-up menu, such that the user customization includes defining the task executed by a menu item in response to being selected from the pop-up menu and defining conditions in which the menu item may be generated in the pop-up menu. In some embodiments, machine-learning techniques may be implemented by the computing system to dynamically identify selection trends and predict suitable menu items to propagate on the pop-up menu.

BRIEF DESCRIPTION OF THE DRAWINGS

Various aspects of this disclosure may be better understood upon reading the following detailed description and upon reference to the drawings in which:

FIG. 4 is a screenshot of an embodiment of a first scripting interface, in accordance with aspects of the present disclosure;

FIG. 7 is a screenshot of an embodiment of a list of scripts, which may be modified in the first scripting interface of FIG. 4, in accordance with aspects of the present disclosure;

FIG. 9 is a screenshot of an embodiment of a table illustrating the relationships between pop-up menus and menu-items of FIG. 5, in accordance with aspects of the present disclosure;

DETAILED DESCRIPTION OF SPECIFIC EMBODIMENTS

Figure 1:
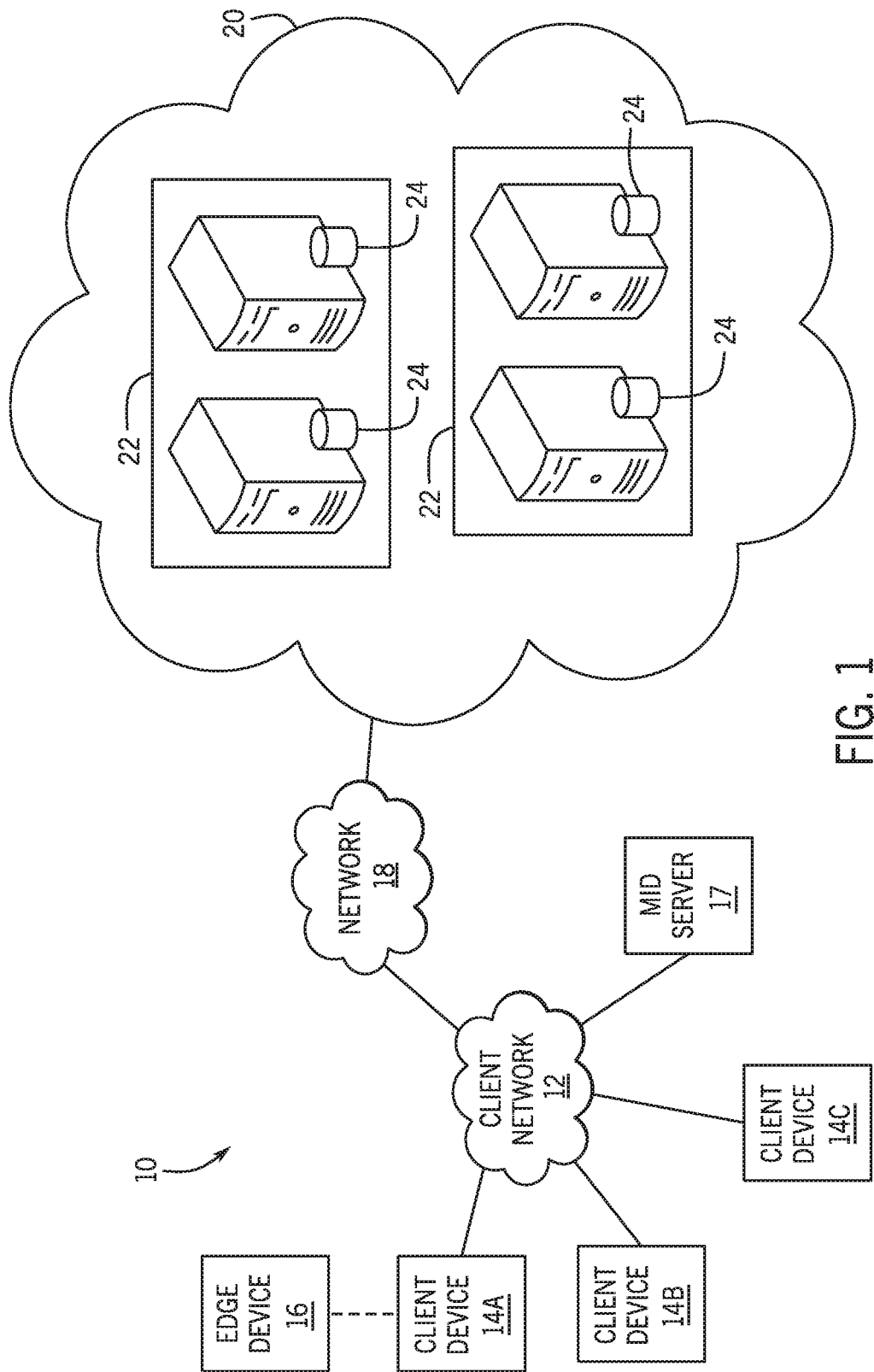
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

In some embodiments, various applications may be implemented on various client instances using script (e.g., computer code). In fact, the script may be stored as a set of instructions in one or more mediums, and the set of instructions may be executed by one or more processors to perform certain operations. Developing the script (e.g., computer code) may require time to debug (e.g., identify and remove software and/or hardware errors) the script to enhance the efficiency and functionality of the operations performed by the script. In some instances, debugging the script may be achieved by reading through the entire code to identify errors. However, this method of debugging may be time consuming and lead to much human error. In certain existing applications, certain aspects of the script may be flagged as containing errors, for example, by underlining the flagged aspects of the code. A user may then be allowed to right click on the flagged aspect of the code to be presented with a standard pop-up window. However, even this pop-up window may be inadequate for efficiently developing, debugging, and modifying script. For example, the pop-up window may present pre-set selectable options for performing certain operations, but may not include an option for performing a desired operation. It is now recognized that there is a need to improve the process of creating, modifying, and debugging script in a script interface.

With the preceding in mind, aspects of the present embodiments include systems and methods for dynamically generating the pop-up menu, including one or more selectable menu items in the scripting interface, based on the context and metadata associated with selected text. In some embodiments, the platform discussed below enables user configuration of the pop-up menu to configure the platform to present the pop-up menu with one or more selectable menu items. Selection of one of the one or more selectable menu items may cause the operation corresponding to the selected menu item to be performed. For example, while debugging code, a user may select a function within the code (e.g., right-click on a highlighted portion of the script), such that a pop-up menu, including updated menu-items (e.g., other suggested functions), is presented to the user. To present this updated menu-item, the platform may execute user configured script based on associated metadata to determine which selectable menu items to include in the pop-up menu. It should be noted that first menu items of a first pop-up menu corresponding to a first selected text may differ from second menu items of a second pop-up menu corresponding to a second selected text because the user may have configured the script such that the first menu items are presented when the first selected text satisfies a first criteria, and the second menu items are presented when the second selected text satisfies a second criteria.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes a bridge device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
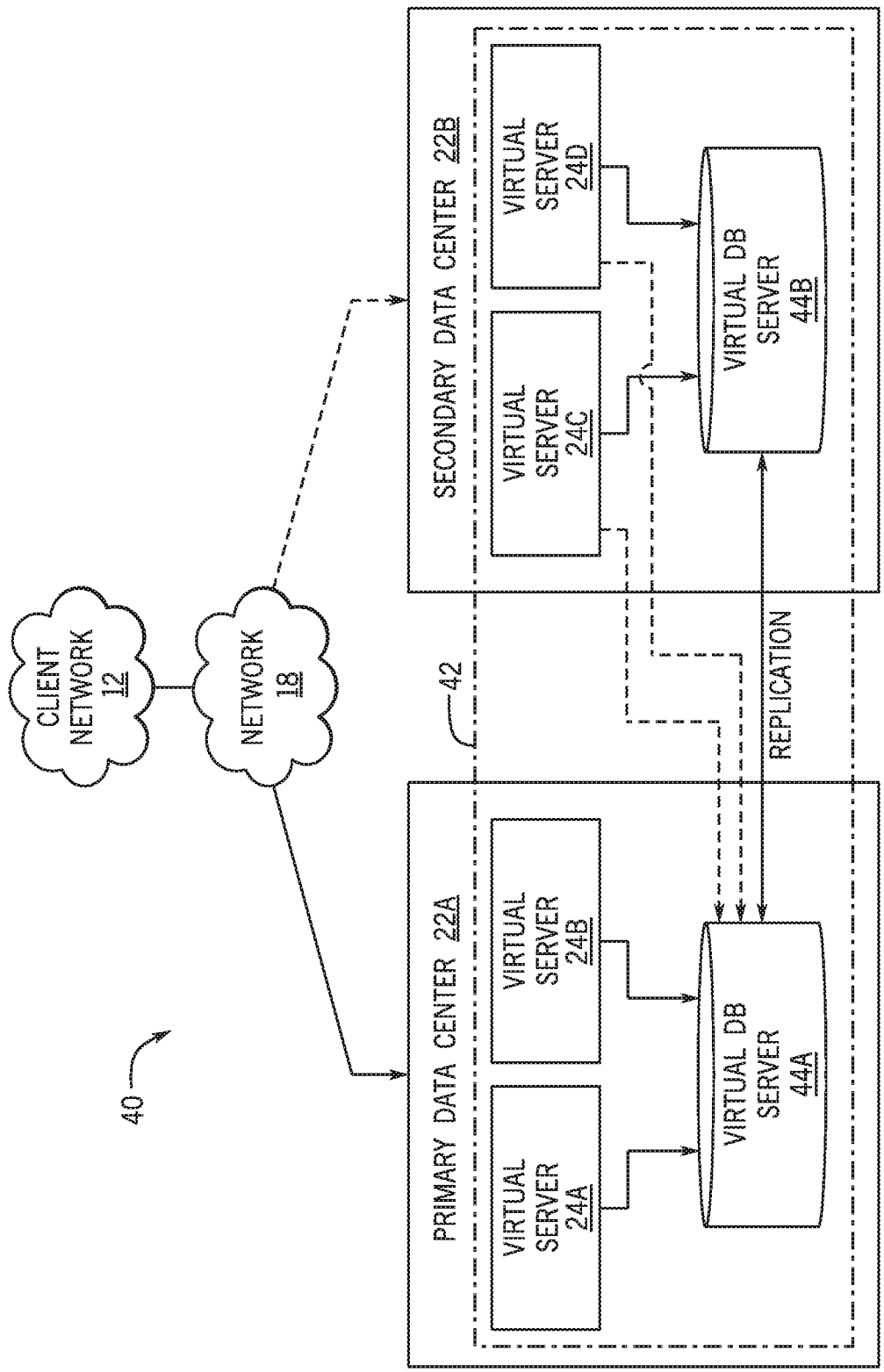
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
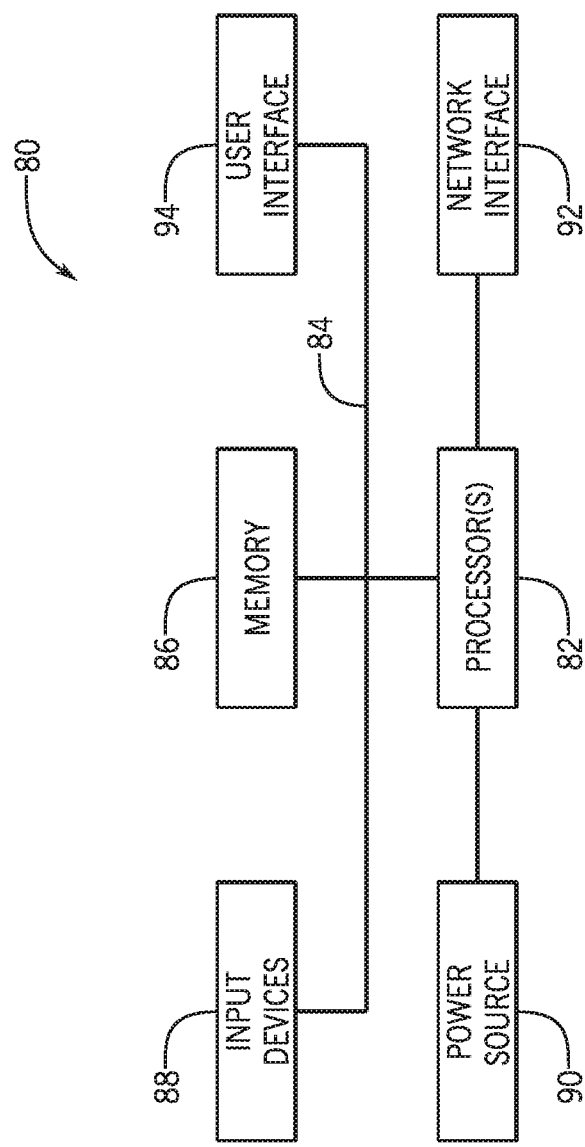
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses 84. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein. The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
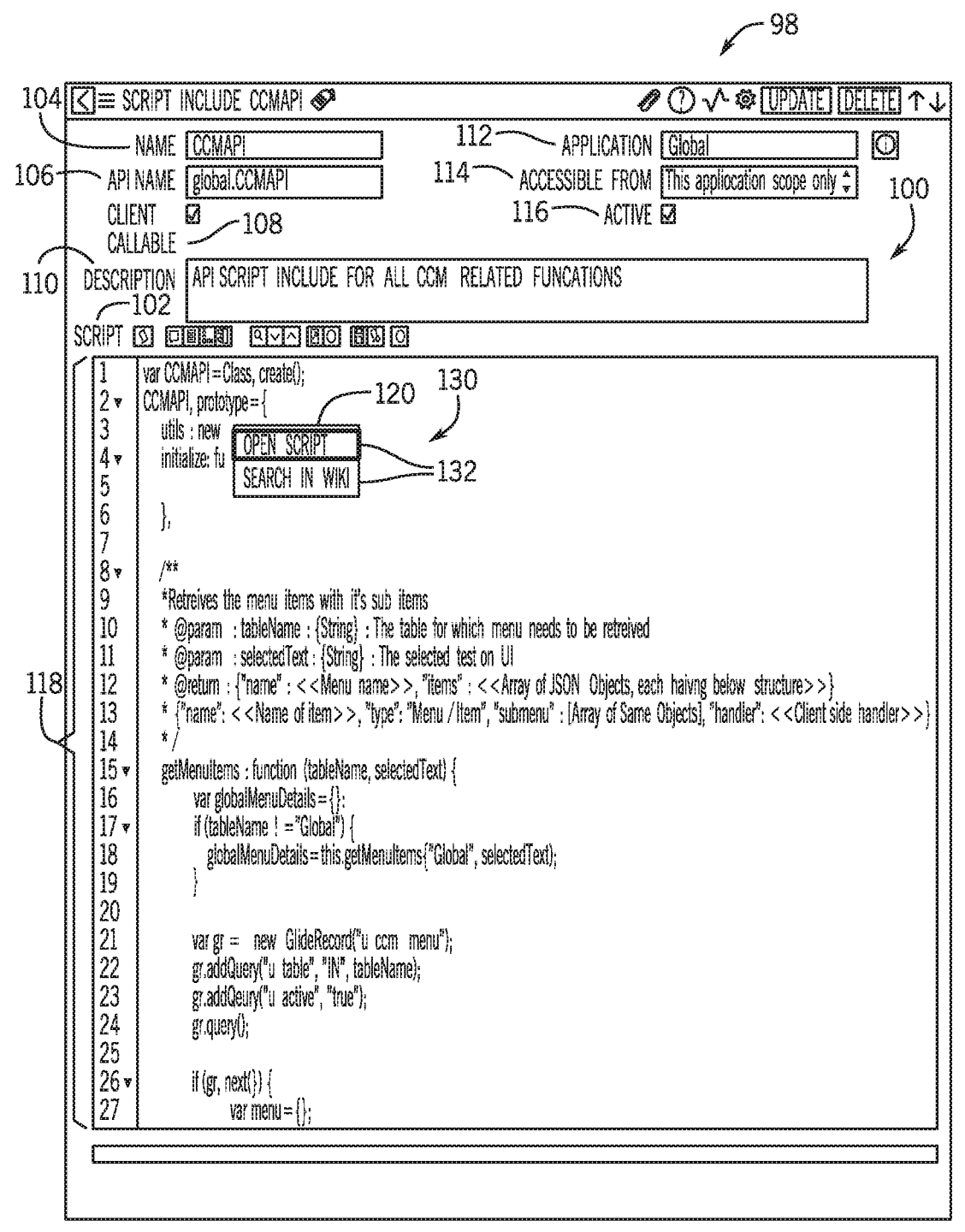

With the preceding in mind, FIG. 4 is an embodiment of a screenshot 98 of a first scripting interface 100, in accordance with aspects of the present disclosure. The first scripting interface 100 may enable a user to develop (e.g., create) script 102, for example, on any suitable computing system. The script 102 may include characters (e.g., letters and numbers) written for a special run-time environment that automates the execution of one or more tasks. In some instances, certain script languages support certain scripts. Scripting languages may range from very small and highly domain-specific languages to general-purpose programming languages used for scripting. Standard examples of scripting languages for specific environments include: Bash, for the Unix or Unix-like operating systems; ECMAScript (JavaScript), for web browsers; among many others. Furthermore, Lua is a scripting language that may be designed and used as an extension language, and Python is a general-purpose language that may be used as an extension language, while ECMAScript is still primarily a scripting language for web browsers, but may also be used as a general-purpose language. This list of scripts and script languages is not comprehensive, and is used to illustrate certain real world applications of the present approach. Indeed, the embodiments disclosed herein may be implemented in conjunction with any suitable script and script language.

In some embodiments, the first scripting interface 100 includes a fillable name feature 104 for specifying the name of the variable associated with script 102. In some embodiments, the name (e.g., "CCMAPI") included in the fillable name feature 104 may be the name, that when called out in script 102 causes execution of the tasks associated with the script 102 corresponding to the name. Additionally, the first scripting interface 100 may include a fillable application programming interface (API) name feature 106 for specifying the API (e.g., "global.CCMAPI") associated with the script 102. Additionally, the first scripting interface 100 may include a selectable client callable feature 108 that, when selected, enables the script 102 to be called out (e.g., by its name) in another script. In some embodiments, the first scripting interface 100 may include a fillable description feature 110 for specifying a brief description of the script 102. For example, in the illustrated embodiment, the fillable description feature 110 specifies "API script include for all CCM related functions."

The first scripting interface 100 may include a fillable or selectable application feature 112 for specifying the application for which the script 102 is meant for use in. In some embodiments, the first scripting interface 100 may include an accessibility selectable feature 114 for specifying where the script 102 may be accessible from. For example, the accessibility selectable feature 114 may include a drop down menu with a variety of selectable features for specifying that the script 102, one of those options includes specifying that the script 102 is accessible from "this application scope only." Furthermore, the first scripting interface may include a checkbox 116 for specifying whether the script 102 is actively being created, modified, or debugged. For example, when the checkbox 116 is selected, the checkbox 116 may indicate that the script is being created, modified or debugged, and when the checkbox is not selected, the checkbox may indicate that the script has been finalized and is ready for use. The various selectable or Tillable features discussed above may receive user inputs to specify the criteria and configure the script 102. In some embodiments, the first scripting interface 100 may include other features for performing certain suitable operations, such as saving changes made to the script 102, deleting the script, sharing the script with suitable recipients, While creating, modifying, or debugging the script 102 in a script text window 118 the user may highlight a portion 120 of the script 102 and right-click on the highlighted portion 120. In some embodiments, the computing system may determine user selection (e.g., right-click) of the highlighted portion 120. In some embodiments, the computing system may also determine a context associated with the highlighted portion 120 to access metadata associated with the entire script 102 and the highlighted portion 120. The computing system may then generate a pop-up menu 130 with suitable menu items 132 based on the context and metadata. For example, in the illustrated embodiment, the computing system generates a pop-up menu 130 with two menu items (e.g., "Open Script" and "Search in WIKI"). User selection of one of the menu items 132 causes the computing system to perform the task associated with the selected menu item 132. Using the techniques described herein, the menu items 132 presented on the pop-up menu 130 for a given situation (e.g., selection of a certain highlighted portion 120) may be updated by a user or by machine-learning techniques. As discussed in detail below, a user may update conditions for presenting certain menu items 132 and the task executed by the menu item 132 upon selection (e.g., left click) of the menu item 132.

As used herein, "context" may refer to data associated with how the highlighted portion 120 (e.g., the selected portion of text in the script 102) fits into the script 102 as a whole or with respect to a portion of adjacent or nearby script. For example, the highlighted portion 120 may include a variable being used by a function within the script 102, such that the context includes data identifying the highlighted portion 120 as a variable being used by the function in a certain manner within the script 102. Furthermore, as used herein "the metadata" may include data associated with developing script 102, such as user or automatically configured data determining when to present the menu items 132 in the first scripting interface 100, a user or automatically defined function for each menu item 132 in the pop-up menu 130, or any other data useful in determining which menu items to aggregate on the pop-up menu 130. The computing system may determine the context by dynamically querying the metadata to determine menu items 132 to present in a pop-up menu 130. In some embodiments, dynamically querying the metadata may include querying the metadata to facilitate data navigation through the metadata. This data navigation may be realized by the computing system by utilizing various numerical methods, such as root findings, numerical optimizations, least-square regressions, neural network arrangements, and the like.

While the foregoing example includes highlighting a portion 120 of the script 102, and then right-clicking on the highlighting portion 120 of the script 102 to cause the computing system to present the pop-up menu 130 of menu items 132, it should be understood, that the pop-up menu 130 may be generated upon any suitable user selection. Furthermore, in some embodiments, the pop-up menu 130 may be automatically generated by the computing system, for example, in response to a triggering event, such as identifying an error in the script 102, determination of a suggestion for finishing a line of script 102, just to name a few. The computing system may generate menu items 132 for remedying the error in the script 102. Additionally, selection of the menu item 132 from the pop-up menu 130 may be realized by any suitable user input, such as left-clicking on a mouse, touching the touch screen, and the like.

Figure 5:
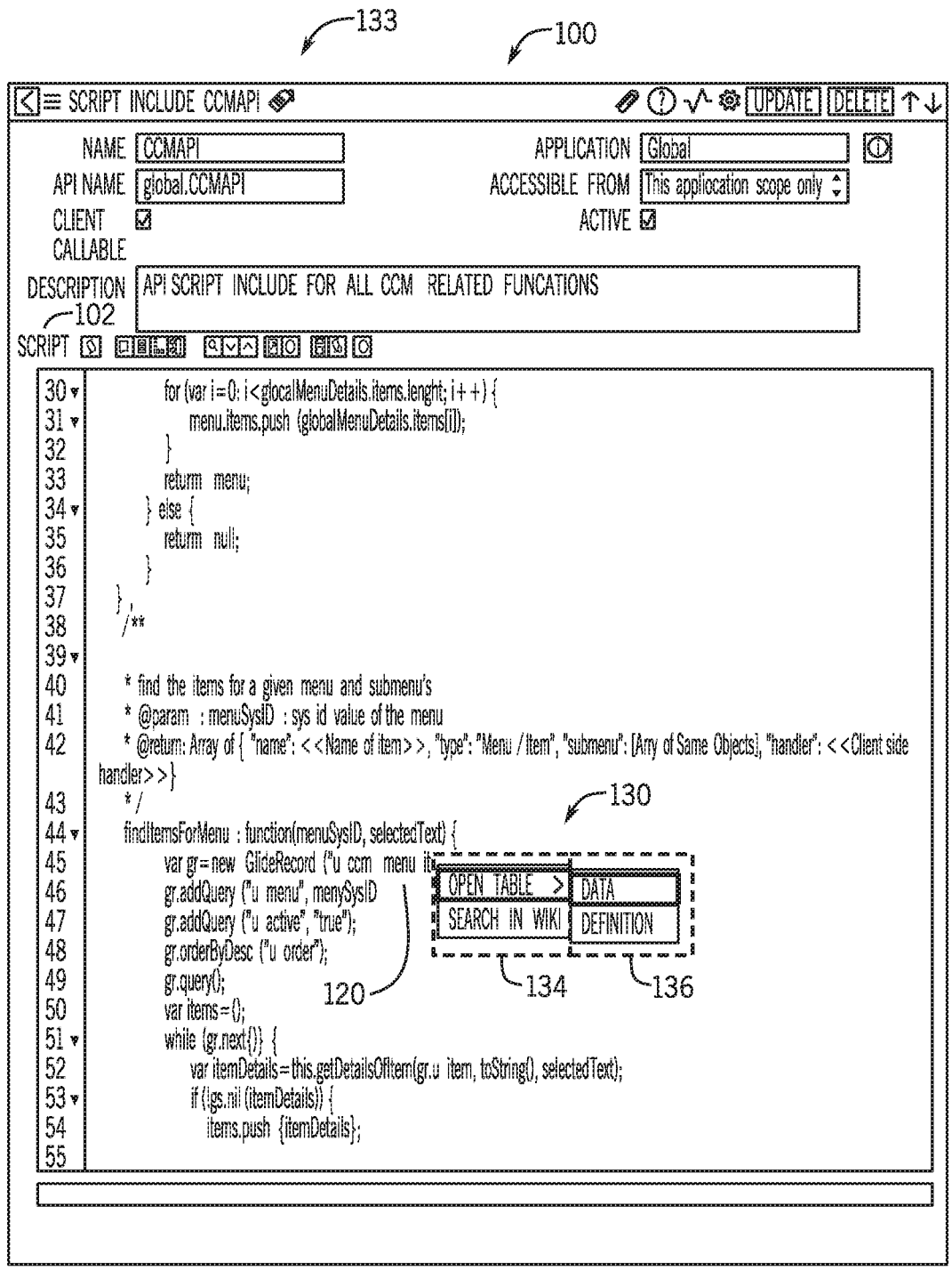
FIG. 5 is a screenshot of an embodiment of the first scripting interface of FIG. 4 generating a pop-up menu with menu-items, in accordance with aspects of the present disclosure.

FIG. 5 is a screenshot 133 of an embodiment of the first scripting interface 100 of FIG. 4 generating a pop-up menu 130 with menu-items 132, in accordance with aspects of the present disclosure. In some embodiments, after selection of the highlighted portion 120, the computing system may cause generation of a pop-up menu 130 in close proximity to where the selection of the highlighted portion 120 was made, such that the user does not have to navigate the selection icon (e.g., selection arrow) a long distance to make a subsequent selection of a menu item 132. In some embodiments, the pop-up menu 130 includes menu items 132 presented in accordance with a hierarchical arrangement. For example, in the illustrated embodiment, the menu items 132 are arranged with parent menu items 134 generated on a column with the corresponding child menu items 136 for the parent generated on an adjacent column. In the illustrated embodiment, the selection icon hovers over the "Open Table" menu item to cause the computing system to generate the corresponding child menu items 136 (e.g., "Data" and "Definition"). Additionally, when the selection icon hovers over the "Search in WIKI" menu item, the computing system may generate the corresponding child menu items, if the "Search in WIKI" menu item includes child menu items. It should be understood that in some embodiments, some menu items 132 may be parent menu items 134, some menu items 132 may be child menu items 136, and some menu items may be both child and parent menu items 134, 136. As discussed in detail below, the computing system may receiving a user criteria to update conditions for presenting certain menu items 132 and the task executed by the menu item 132 upon selection (e.g., left click) of the menu item 132. In addition, the user criteria may specify the hierarchical arrangement of the menu items 132 (e.g., parent vs. child arrangement).

Figure 6:
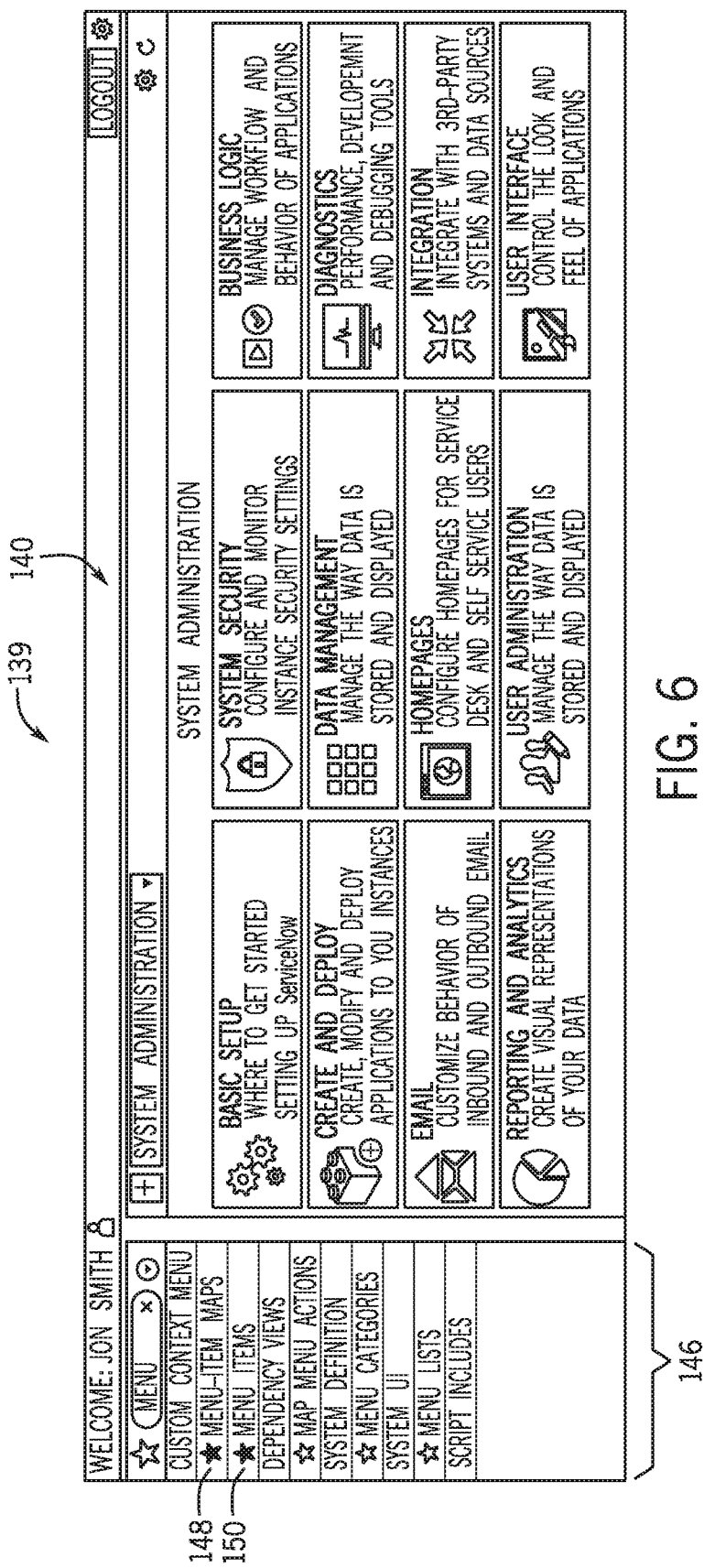
FIG. 6 is a screenshot of an embodiment of a dashboard enabling access to the first scripting interface of FIG. 4, in accordance with aspects of the present disclosure.

FIG. 6 is a screenshot 139 of an embodiment of a dashboard 140 enabling access to the first scripting interface 100 of FIG. 4, in accordance with aspects of the present disclosure. In some embodiments, after the computing system receives login credentials associated with a client instance account, the computing system enables user access and may present the user with the dashboard 140. The login credentials may include a username and a corresponding password. It should be understood that in some embodiments, the login credentials may not be required to access the dashboard 140 and the first scripting interface 100.

The dashboard 140 may include a portal option for selecting the job title associated features that a user may want to be presented. For example, in the illustrated embodiment, the portal option is designated as "System Administrator," such that the dashboard 140 presents the illustrated selectable objects. In some embodiments, the portal options may be based on an authority level of the logged in user (e.g., "Jon Smith). For example, in the illustrated embodiment, the dashboard 140 includes selectable dashboard items associated with the portal option. Since the portal option is designated as "System Administrator," the dashboard 140 may include dashboard items, such as "Basic Setup," "System Security," "Business Logic," "Create and Deploy," Data Management," and Diagnostics, just to name a few.

In the illustrated embodiment, the dashboard 140 includes a navigation panel 146 enabling the execution of certain tasks, such as searching configuration items (CIs) on the dashboard 140. In some embodiments, the navigation panel includes a first selectable option 148 (e.g., "Menu-Item Map") that when selected enables viewing and reconfiguration of a map correlating the menu items 132 to their corresponding pop-up menus 130. Additionally, the navigation panel 146 may include a second selectable option 150 (e.g., "Menu Items) that, when selected, enables viewing and modifications to a list of menu items 132. It should be understood that the navigation panel 146 may include any other selectable options for performing any suitable task.

FIG. 7 is a screenshot 159 of an embodiment of a script list 160, which may be modified in the first scripting interface 100 of FIG. 4, in accordance with aspects of the present disclosure. The computing system may cause the platform to transition from the screen of the dashboard 140 of FIG. 6 to the screen of script list 160 after receipt of a selection of a selectable option for viewing existing scripts. For example, a user may navigate the selectable icon to the selectable option for viewing script, and select (e.g., click on) the selectable option for viewing script to transition to the script list 160. The script list 160 may include scripts 102 that are in progress or that are being debugged. For example, each of the scripts 102 in the script list 160 may include a name 162 used to identify the script 102, an application 164 in which the script 102 are being employed, an active indication 166 (e.g., using "true" to indicate that the script 102 is completed and using "false" to indicate that the script 102 is not yet complete and may need to be debugged), a brief description 168 for providing a quick summary of the script 102, the updated date 170 (e.g., the last day the script was modified and/or updated), and additional script information 172. User selection of the name 162 corresponding to the script 102, may cause the computing system to generate the first scripting interface 100 of FIG. 4, including the selected script 102. In some embodiments, the script list 160 includes a selectable option 174 for creating a new script 102 (e.g., in the first scripting interface).

Figure 8:
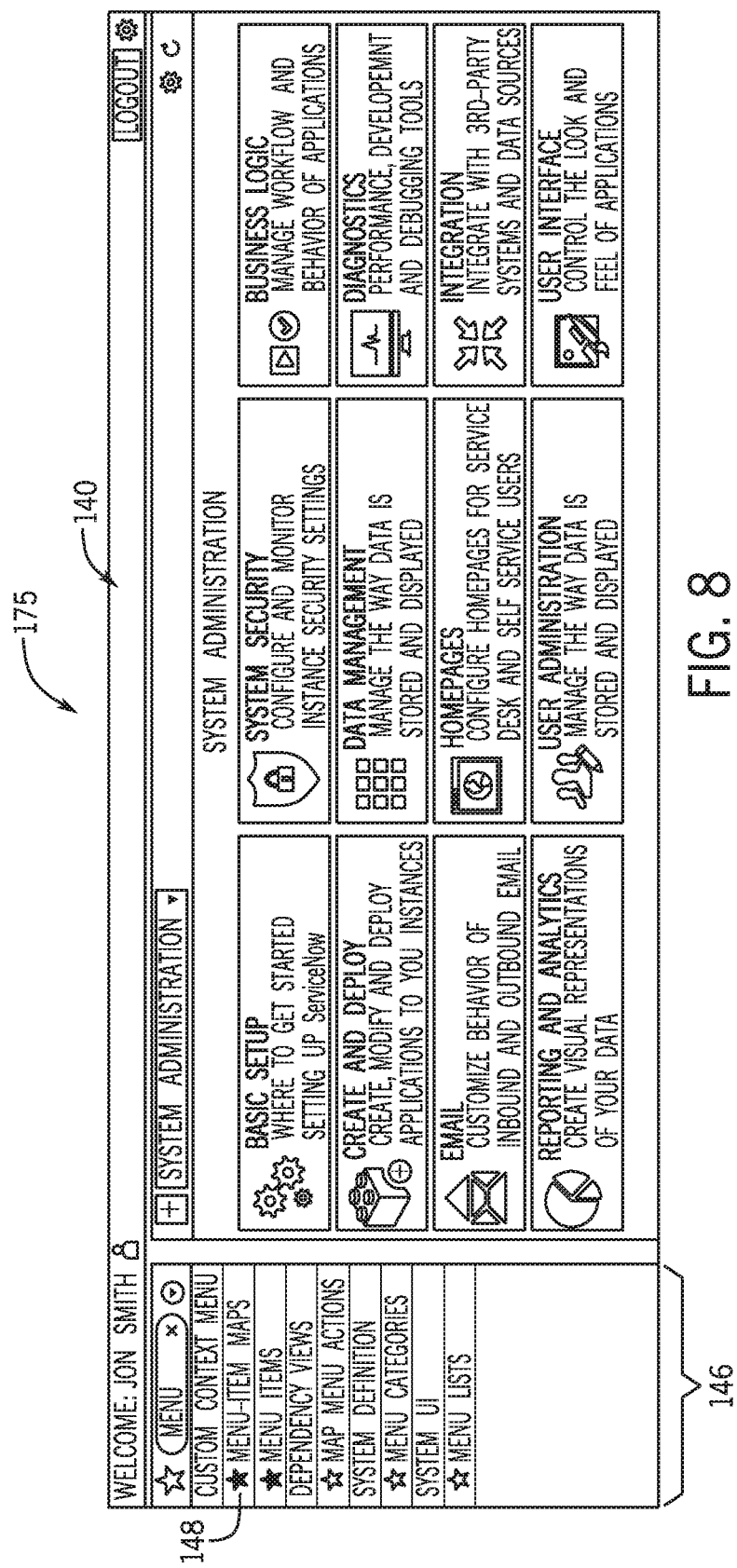
FIG. 8 is a screenshot of an embodiment of a dashboard of FIG. 6 enabling access to view a table of relationships between pop-up menus and menu-items of FIG. 5, in accordance with aspects of the present disclosure.

FIG. 8 is a screenshot 175 of an embodiment of a dashboard 140 of FIG. 6 enabling access to view a table of relationships between the pop-up menus 130 and menu-items 132 of FIG. 5, in accordance with aspects of the present disclosure. In the illustrated embodiment, the user may hover the selection icon over the first selectable option 148 (e.g., "Menu-Item Map") to view a table defining relationships between the menu items 132 to their corresponding pop-up menus 130.

FIG. 9 is a screenshot 177 of an embodiment of a table 180 illustrating the relationships between pop-up menus 130 and menu-items 132 of FIG. 5, in accordance with aspects of the present disclosure. In some embodiment, the names of menu items 132 are aggregated in a first column, the pop-up menus 130 are aggregated on a second column, an order 182 in which the menu items are aggregated in the corresponding pop-up menus 130 is presented in a third column, and the active indication 166 (e.g., using "true" to indicate that the corresponding menu item 132 will be aggregated on the pop-up menu 130 and using "false" to indicate that the corresponding menu item 132 will be omitted from the pop-up menu 130). In the illustrated embodiment, the order in which the menu items are generated in the corresponding pop-up menus 130 is presented next to the active indication 166 as numbers (e.g., one to indicate first, two to indicate second, etc.). Furthermore, while in the illustrated embodiment, the menu items 132 are aggregated on the rows (e.g., of the first column), and the attributes (e.g., 132, 130, 182, 166) of the menu items 132 are aggregated on the columns, it should be noted that, in some embodiments, the menu items 132 may be aggregated on the columns, and the attributes may be presented on the rows.

In the illustrated embodiment, the "Script Include Menu" 184 pop-up menu 130 includes two menu items 132, namely, "Open Table" 186 and "Open Script" 188. Additionally, in the illustrated embodiment, the active indication 166 for the "Open Table" 186 menu item 132 is designated as "false" to indicate that the corresponding menu item 132 will be omitted from the "Script Include Menu" 184 pop-up menu 130, and the active indication 166 for the "Open Script" 188 menu item 132 is designated as "true" to indicate that the corresponding menu item 132 will be aggregated on the "Script Include Menu" 184 pop-up menu 130.

In some embodiments, the computing system enables a modification (e.g., user modification) of the illustrated attributes (e.g., 132, 130, 182, and 166) of menu items 132. For example, the computing system may enable a user to input or change an order 182 for presenting the menu items 132 on their corresponding pop-up menus 130. The computing system may enable a user to activate or deactivate the menu items within the pop-up menus 130 by modifying the active indication 166. In addition, the computing system may enable the user to assign the menu items 132 to certain pop-up menus 130. For example, in the illustrated embodiment, the "Open Change" 190 menu item 132 is not assigned to a pop-up menu 130 since the corresponding pop-up menu cell 192 is blank. The computing system may enable the user to specify the corresponding pop-up menu into the corresponding pop-up menu cell 192, such that the user may type the name of an existing pop-up menu 130 into the corresponding pop-up menu cell 192, drag an existing pop-up menu 130 into the corresponding pop-up menu cell 192, and the like.

In some embodiments, the information on the table 180 may be stored as metadata (e.g., in data servers). For example, the menu items 132 corresponding to the pop-up menus 130 may be stored as metadata accessible by the computing system. As discussed in detail below, the script defining the task executed by the menu items 132 upon selection of the menu items may also be stored as metadata.

Figure 10:
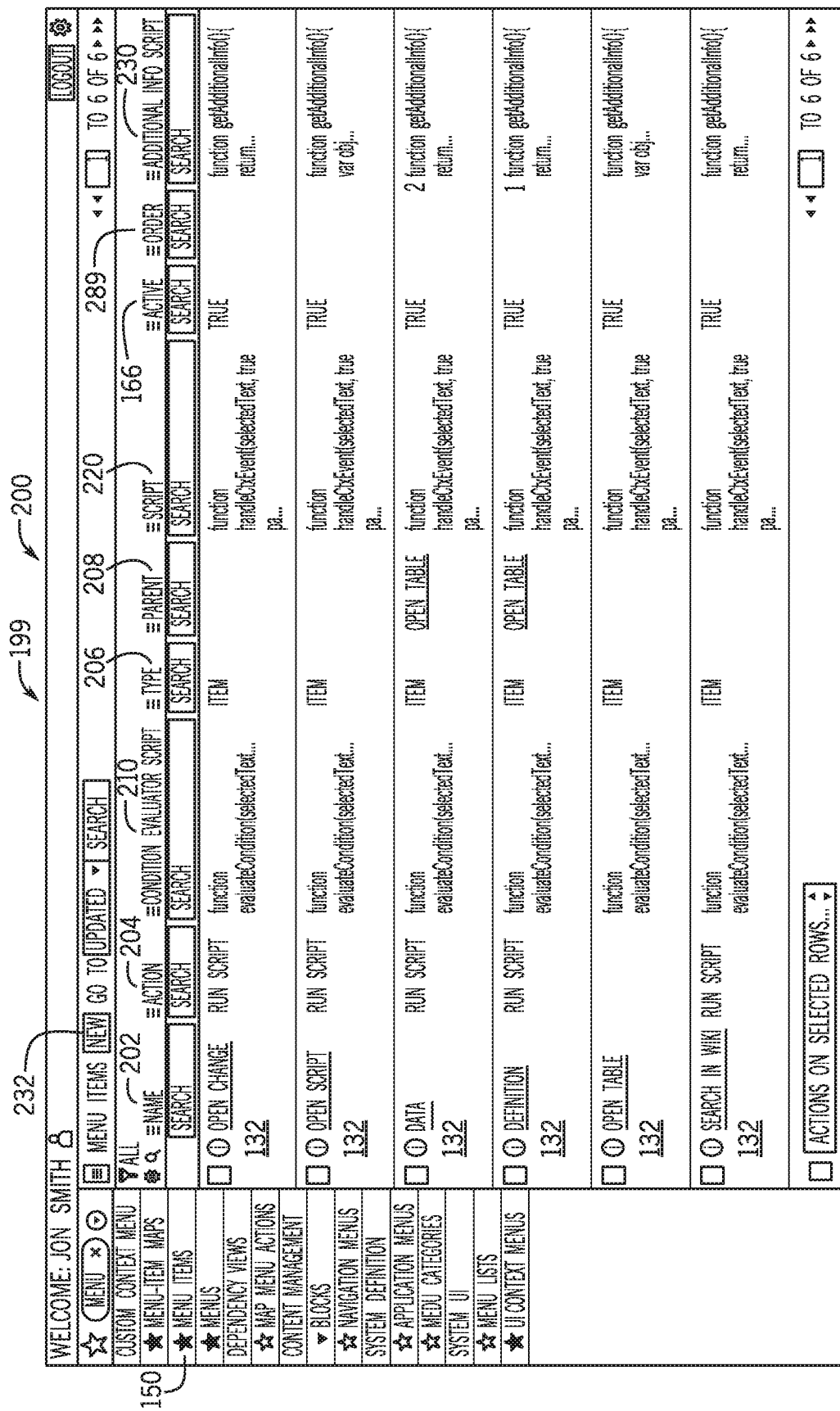
FIG. 10 is a screenshot of an embodiment of a list of menu items, in accordance with aspects of the present disclosure.

FIG. 10 is screenshot 199 an embodiment of a list 200 of menu items 132, in accordance with aspects of the present disclosure. As discussed in detail above, the navigation panel 146 may include the second selectable option 150 (e.g., "Menu Items) that, when selected, enables viewing and modifications to a list of menu items 132. The list 200 of menu items 132 may be generated in response to selection of the second selectable option 150. The menu items 132 may be presented on the rows and their corresponding attributes on the columns. For example, in the illustrated embodiment, the attributes include the name 202 (e.g., of the menu items), an action 204 (in this example "Run Script") associated with the script, a type 206 (e.g., "item" or "menu"), the parent menu items 208, an activity indication 166 (e.g., using "true" to indicate that the script 102 is completed and using "false" to indicate that the script 102 is not yet complete and may need to be debugged), an order 209 in which the menu item aggregated on the pop-up menu, condition evaluator script 210, task defining script 220, and additional information script 230. These attributes corresponding to the menu items 132 may be stored as metadata. Furthermore, in the illustrated embodiment, the screenshot 199 of the list 200 includes a new menu item option 232 for creating a new menu item. Although only the attributes corresponding to menu items 132 are illustrated, it should be noted that the computing system may also generate attributes for pop-up menus 130 that may be customized.

The condition evaluator script 210 may include script 102 defining conditions in which the corresponding menu item 132 may be aggregated on a pop-up menu 130. The task defining script 220 may include script 102 defining a task that is performed or a function that is executed in response to the corresponding menu item 132 being selected from the pop-up menu 130. The additional information script 230 may receive script for defining additional features of the menu item 130. The computing system enables selection of one of the menu items 132 from the list 200, such that selecting a menu item 132 enables the above-mentioned attributes to be customized, as discussed below with respect to FIG. 11.

Figure 11:
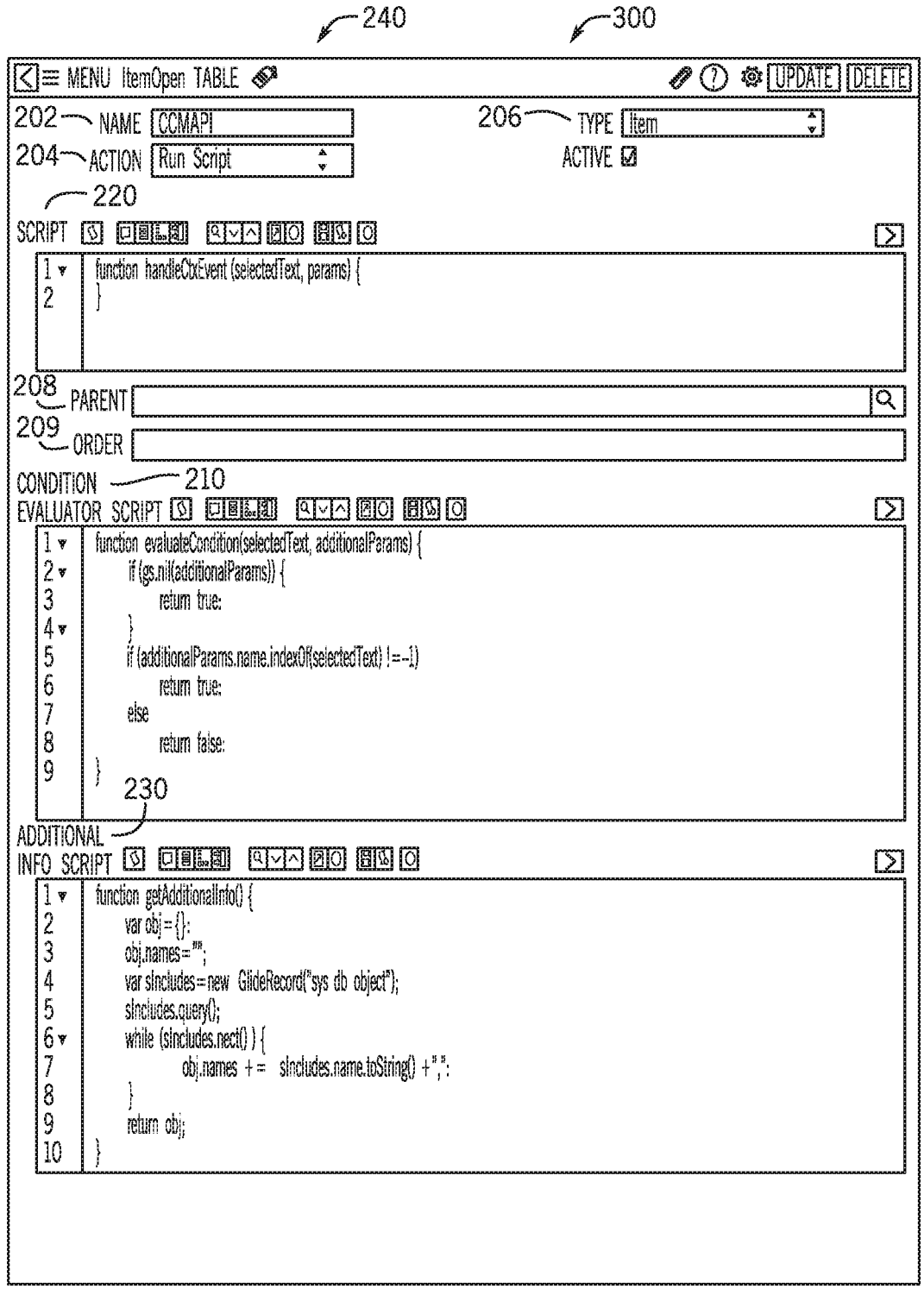
FIG. 11 is a screenshot of a second scripting interface enabling customization of a menu item, in accordance with aspects of the present disclosure.

FIG. 11 is a screenshot 240 of a second scripting interface 300 enabling customization of a menu items 132, in accordance with aspects of the present disclosure. For example, in transitioning from the embodiment of the screenshot of FIG. 10 to the embodiment of the screenshot of FIG. 11, the computing system may receive a user selection of the "Open Table" menu item from the list 200 of FIG. 10, such that the computing system generates the second scripting interface 300. The second scripting interface 300 may enable user modifications to the menu item 132 (in this example "Open Table") selected from the list 200. While in the illustrated embodiment, the second scripting interface 300 is generated in response to a selection from the list 200, it should be understood that in some embodiments, the second scripting interface 300 may be generated in response to a selection from the navigation panel 146, a selection from a menu item 132 on a pop-up menu 130 generated on the first scripting interface 100, and the like.

In the illustrated embodiment, the computing system enables modification of the name 202 (in this example, "Open Table"), the action 204 (in this example "Run Script") associated with the script, the type 206 (in this example "Item"), the parent menu items 208 (in this example, not specified), the activity indication 166 (in this example, checked to indicate that the menu item 132 may be generated on a pop-up menu 130), the order 209 in which the menu item aggregated on the pop-up menu (in this example, not specified), the condition evaluator script 210, the task defining script 220, and the additional information script 230. The computing system enables modification of these features of the second scripting interface 300, for example, by enabling users to modify the text in the corresponding text boxes.

In some embodiments, the task defining script 220 defines the task executed by the processor of the computing system in response to selection of the name 202 of the menu item 132 (in this example, "Open Table") from the pop-up menu 130. For example, the task defining script 220 may include script 102, including instructions for determining a minimum of a set of values, displaying parameters, generating a table of relevant information, and the like. The task defining script 220 may be stored as the metadata.

In some embodiments, the condition evaluator script 210 defines the context and conditions in which the corresponding menu item 132 is displayed on the pop-up menu 130. The condition evaluator script 210 may include script 102, including instructions for defining a criteria that, when met, causes the menu item 132 (in this example, "Open Table") to be presented on the pop-up menu 130. The task defining script 220 may be stored as the metadata.

In some embodiments, the additional information script 230 defines additional features to configure the corresponding menu item 132 and/or pop-up menu to operate based on user preference. The additional information script 230 may include script 102, including instructions for further defining the criteria of the condition evaluator script 210 and for further defining the task executed by the task defining script 220. The additional information script 230 may further define any aspect of the menu item 132 or pop-up menu 130. The additional information script 230 may be stored as the metadata.

While the embodiment of FIG. 11 is discussed with regard to user modifications to define the task defining script 220, the condition evaluator script 210, and the additional information evaluator script 230 to modify the task executed by and the conditions for generating the menu item 132, it should be understood that the computing system may store (e.g., as metadata) user modifications made by the user within a scripting interface (e.g., the first scripting interface 100) to automatically predict the menu items 132 presented on the pop-up menu 130 with or without user modification to the task defining script 220, the condition evaluator script 210, and the additional information evaluator script 230. In some embodiments, machine-learning techniques facilitate learning the techniques used in developing, debugging, or modifying script. For example, the computing system may identify that a first function is being used in certain contexts, such as while processing a first set of metadata. The computing system may identify that the user employed a different function while processing the first set of metadata, and the computing system may dynamically generate pop-up menu 130 with updated menu items 132, such that the updated menu items include the first function. In some embodiments, machine-learning techniques may be used to build a library of metadata, including a variety of contexts in which the generation of pop-up menus 130 with certain menu items 132 is appropriate after a selection (e.g., right-click) is made.

Figure 12:
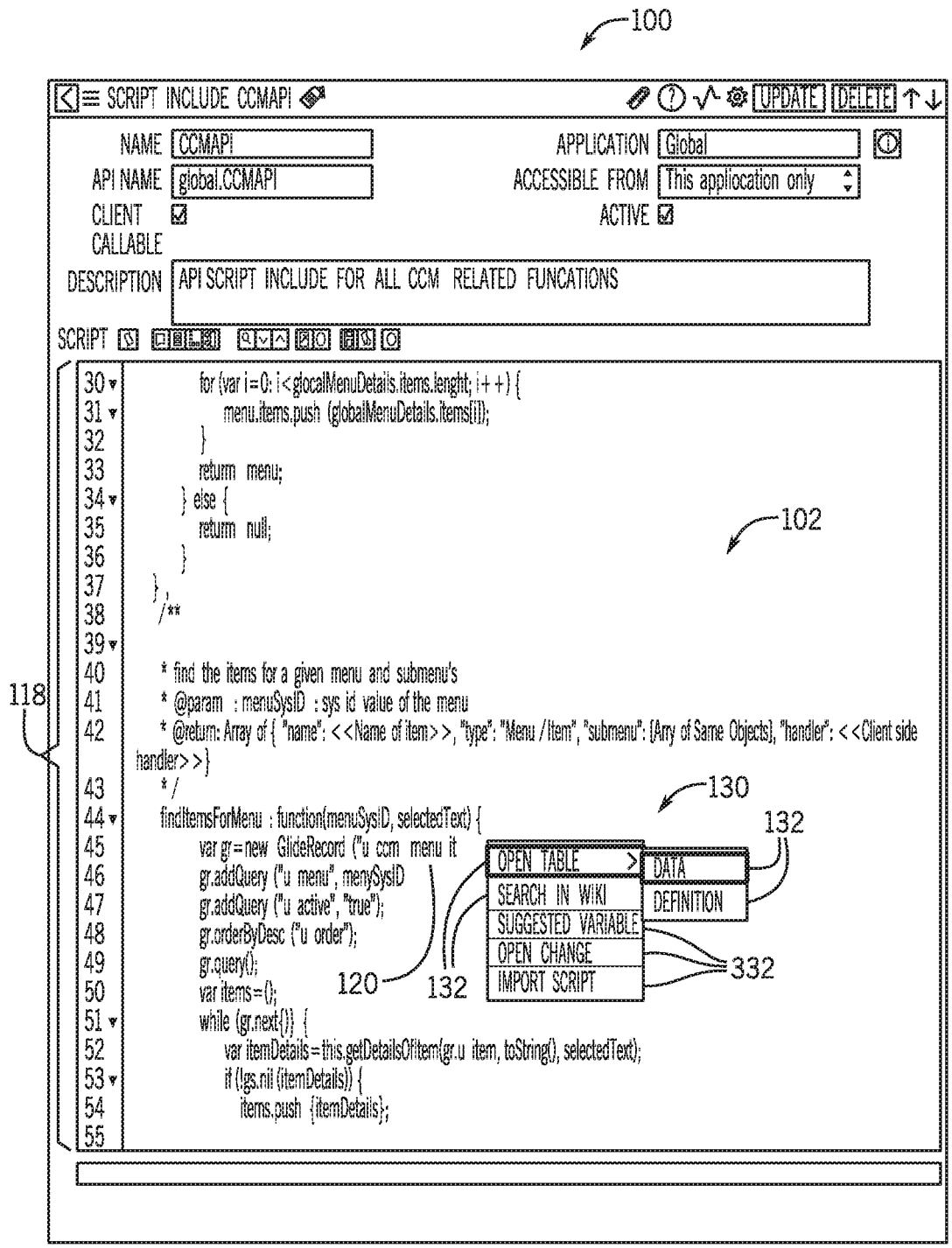
FIG. 12 is a screenshot of the first scripting interface of FIG. 4, in which the pop-up menu has been dynamically updated to include updated menu items, in accordance with aspects of the present disclosure.

FIG. 12 is a screenshot of the first scripting interface 100 of FIG. 4, in which the pop-up menu 130 has been dynamically updated to include updated menu items 332, in accordance with aspects of the present disclosure. The illustrated embodiment of FIG. 12 differs from the embodiment of FIG. 5 in that the pop-up menu 130 of FIG. 12 includes different menu items (e.g., dynamically updated menu items 332 in addition to including the menu items 132) on the pop-up menu 130. For example, in the illustrated embodiment, the menu items referenced with "132" are the menu items of FIG. 12 that are not found in the pop-up menu 130 of the embodiment of FIG. 5.

The computing system may generate the menu items 132, 332 on the script text window 118 in response to a user selection (e.g., a right-click) of the highlighted portion 120 of the script 102. In some embodiments, the computing system may also determine a context associated with the user selected (e.g., right-clicked) highlighted portion 120 to access metadata associated with the entire script 102 and/or the highlighted portion 120. The computing system may then generate a pop-up menu 130 with suitable menu items (in this example, menu items 132 and 332) based on the context and metadata. For example, in the illustrated embodiment, the computing system generates a pop-up menu 130 with five parent menu items that may include child menu items generated in a hierarchical arrangement. User selection of one of the menu items 132, 332 causes the computing system to perform the task associated with the selected menu item 132, 332. As discussed in detail above, the task may be defined by a user in the task defining script 220 or may be automatically determined and generated by the computing system using machine-learning techniques.

Using the techniques described herein, the menu items 132 presented on the pop-up menu 130 for a given situation (e.g., selection of a certain highlighted portion 120 relative to the entire script) may be dynamically updated by a user or by machine learning techniques. For example, in response to a user making another text selection for another portion of the script 102, the computing system may execute instructions to determine the selection of text, access metadata associated with the selection of text, execute script based on the associated metadata to dynamically determine menu items. The computing system may then generate the pop-up menu, including the dynamically determined menu items, in the scripting interface proximate (e.g., near) where the user selection (of the text) was made to minimize the distance a user has to traverse on the screen to select one of the menu items. The computing system may determine the context by dynamically querying the metadata to determine menu items 132 to present in a pop-up menu 130. In some embodiments, dynamically querying the metadata may include querying the metadata to facilitate data navigation through the metadata.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a client instance hosted by a platform, wherein the client instance is accessible via at least one or more remote client networks;
a scripting interface implemented within the client instance, wherein the system is configured to perform operations comprising:
determining a selection of text on the scripting interface;
determining a context associated with a flagged scripting error for the selected text, wherein the context comprises an indication of whether the selected text comprises one or more of an algorithm, a compiler, a floating point, a function, a variable, an interpreter, or a Boolean operation used by another function within the scripting interface;
accessing metadata based on the selected text and the context;
executing a script based on the metadata to dynamically determine, based on the context, one or more context-specific menu items that are specific to the client instance, wherein the one or more context-specific menu items comprise respective functionality related to addressing the flagged scripting error;
generating a menu in the scripting interface based on the script, wherein the menu comprises the one or more context-specific menu items;
receiving a selection indicative of a request to modify a respective menu item of the one or more menu items;
generating a customization scripting interface that is different from the scripting interface in response to receiving the selection indicative of the request to modify the respective menu item;
receiving a first script set, via the customization scripting interface, defining an executable function for one of the one or more context-specific menu items; and
receiving a second script set, via the customization scripting interface, defining one or more conditions under which the one of the one or more context-specific menu items is presented in the menu.

2. The system of claim 1, wherein the context is determined based on a dynamic context of a query for the metadata, wherein the script is executed based at least on the dynamic context of the query to facilitate performing the query.

3. The system of claim 1, wherein the script is executed based on determination that the context satisfies the one or more conditions defined by the second script set.

4. The system of claim 1, wherein the operations comprise performing a functionality of a selected context-specific menu item based on the first script set.

5. The system of claim 1, wherein the first script and the second script are stored in the system as a portion of the metadata.

6. The system of claim 1, wherein determining the context associated with the selected text comprises determining whether the selected text comprises the algorithm, the compiler, the floating point, the function, the variable, the interpreter, the Boolean operation, or any combination thereof.

7. The system of claim 1, wherein the script is configured by a user to execute the respective functionality, wherein an indication of the respective functionality is presented on the one or more context-specific menu items.

8. The system of claim 1, wherein the selection of the text is realized by a user-right click on the text from the scripting interface.

9. The system of claim 1, wherein the operations comprise:
receiving a third script set defining a first aspect of the executable function, a second aspect of the one or more conditions, or both.

10. The system of claim 1, wherein the operations comprise:
in response to a selection of a context-specific menu item of the one or more context-specific menu items, performing a functionality of the selected context-specific menu item.

11. A method, comprising:
determining a selection of text on a scripting interface implemented on a client instance hosted by an enterprise management platform, wherein the client instance is accessible via at least one or more remote client networks;
determining a context associated with a flagged scripting error for the selected text, wherein the context comprises an indication of whether the selected text comprises one or more of an algorithm, a compiler, a floating point, a function, a variable, an interpreter, or a Boolean operation used by another function within the scripting interface;

accessing metadata based on the selected text and the context;

executing a script based on the metadata to dynamically determine, based on the context, one or more context-specific menu items, wherein the one or more context-specific menu items comprise respective functionality related to addressing the flagged scripting error;

generating a menu in the scripting interface based on the script, wherein the menu comprises the one or more context-specific menu items;

receiving a selection indicative of a request to modify a respective menu item of the one or more menu items;

generating a customization scripting interface that is different from the scripting interface in response to receiving the selection indicative of the request to modify the respective menu item;

receiving, via the customization scripting interface, a first script set defining an executable function for one of the one or more context-specific menu items; and receiving, via the customization scripting interface, a second script set defining one or more conditions under which the one of the one or more context-specific menu items is presented in the menu.

12. The method of claim 11, wherein the context is determined based on a dynamic context of a query for the metadata, wherein the script is executed based at least on the dynamic context of the query to facilitate performing the query for the metadata.

13. The method of claim 11, wherein generating the menu comprises generating the one or more context-specific menu items in accordance with a hierarchical arrangement, wherein a portion of the one or more context-specific menu items comprises a plurality of parent context-specific menu items, wherein another portion of the parent context-specific menu items comprises child context-specific menu items.

14. The method of claim 13, comprising receiving a user criteria defining the hierarchical arrangement of the one or more context-specific menu items.

15. A system, comprising:
an enterprise management platform;
a client instance hosted by the enterprise management platform, wherein the client instance is accessible via at least one or more remote client networks;
a scripting interface implemented within the client instance, wherein the system is configured to perform operations comprising:
tracking user modifications to remedy a flagged scripting error on the scripting interface to dynamically build a library of metadata;
determining the library of metadata comprises a criterion defining conditions under which to present one or more menu items for a plurality of menus based on the tracked user modifications;
enabling customization of the one or more menu items, wherein enabling the customization to the one or more menu items comprises:

receiving a selection indicative of a request to modify a respective menu item of the one or more menu items;

generating a customization scripting interface that is different from the scripting interface in response to receiving the selection indicative of the request to modify the respective menu item;

receiving a first script, via the customization scripting interface, defining an executable function for the respective menu item of the one or more menu items; and receiving a second script, via the customization scripting interface, defining or modifying the criterion; and in response to a user selection of text on the scripting interface:

determining a context, associated with the selected text, that satisfies the criterion, wherein the context comprises an indication of whether the selected text comprises one or more of an algorithm, a compiler, a floating point, a function, a variable, an interpreter, or a Boolean operation used by another function within the scripting interface;

accessing a portion of the metadata based on the selected text and the context;

executing a script, based on the portion of the metadata, to determine, based on the context, one or more context-specific menu items, wherein the one or more context-specific menu items comprise respective operations related to addressing the flagged scripting error; and generating a menu of the plurality of menus in the scripting interface based on the script, wherein the menu comprises the one or more context-specific menu items.

16. The system of claim 15, wherein the operations comprise:
in response to a selection of a context-specific menu item of the one or more context-specific menu items, performing a functionality of the selected context-specific menu item.

17. The system of claim 16, wherein the context is determined based on a dynamic context of a query for data navigation, wherein the script is executed based at least on dynamic context of the query to determine the one or more context-specific menu items.

18. The system of claim 15, wherein dynamically generating the menu comprises generating the one or more context-specific menu items in accordance with a hierarchical arrangement, wherein a portion of the one or more context-specific menu items comprise a plurality of parent context-specific menu items, wherein another portion of the parent context-specific menu items comprise child context-specific menu items.

19. The system of claim 15, wherein the context is determined based on a dynamic context of a query for data navigation, wherein the script is executed based at least on the metadata and the dynamic context of the query to determine the one or more context-specific menu items to facilitate the data navigation.

* * * * *